United States Patent
Roberts et al.

(10) Patent No.: US 8,230,081 B2
(45) Date of Patent: Jul. 24, 2012

(54) FEATURE SET BASED CONTENT COMMUNICATIONS SYSTEMS AND METHODS

(75) Inventors: Brian Roberts, Frisco, TX (US); Don Relyea, Dallas, TX (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 420 days.

(21) Appl. No.: 11/931,674

(22) Filed: Oct. 31, 2007

(65) Prior Publication Data

US 2009/0113032 A1    Apr. 30, 2009

(51) Int. Cl.
*G06F 15/16* (2006.01)
(52) U.S. Cl. .................................. 709/228; 709/229
(58) Field of Classification Search ........... 709/227–229
See application file for complete search history.

(56) References Cited

U.S. PATENT DOCUMENTS

| | | | |
|---|---|---|---|
| 7,315,886 B1 * | 1/2008 | Meenan et al. | 709/219 |
| 2002/0069261 A1 * | 6/2002 | Bellare et al. | 709/218 |
| 2003/0188010 A1 * | 10/2003 | Raza et al. | 709/238 |
| 2004/0015589 A1 * | 1/2004 | Isozu | 709/227 |
| 2004/0024867 A1 * | 2/2004 | Kjellberg | 709/224 |
| 2004/0044730 A1 * | 3/2004 | Gockel et al. | 709/203 |
| 2004/0068472 A1 * | 4/2004 | Sahota et al. | 705/64 |
| 2005/0060411 A1 * | 3/2005 | Coulombe et al. | 709/227 |
| 2007/0118656 A1 * | 5/2007 | Anderson et al. | 709/227 |
| 2007/0198636 A1 * | 8/2007 | Inamoto et al. | 709/203 |
| 2008/0010372 A1 * | 1/2008 | Khedouri et al. | 709/224 |
| 2008/0098093 A1 * | 4/2008 | Simon et al. | 709/219 |
| 2008/0163302 A1 * | 7/2008 | Khedouri et al. | 725/46 |
| 2008/0235746 A1 * | 9/2008 | Peters et al. | 725/111 |
| 2009/0006533 A1 * | 1/2009 | Guo | 709/203 |
| 2009/0313645 A1 * | 12/2009 | Sathish et al. | 719/328 |

* cited by examiner

*Primary Examiner* — Larry Donaghue (57) ABSTRACT

In an exemplary system, a plurality of access devices comprising at least a first access device and a second access device is selectively and communicatively coupled to a profile management subsystem. The profile management subsystem is configured to maintain profile data representing a feature set of at least one of the plurality of access devices, receive a profile request signal representing a request for profile data corresponding to the second access device from the first access device, and transmit the requested profile data to the first access device in response to the profile request signal. The first access device is configured to transmit content to the second access device in accordance with a feature set represented by the profile data corresponding to the second access device.

20 Claims, 9 Drawing Sheets

FEATURE SET BASED CONTENT COMMUNICATIONS SYSTEMS AND METHODS

BACKGROUND INFORMATION

Advances in electronic communications technologies have interconnected people and allowed for distribution of information perhaps better than ever before. To illustrate, cellular telephones, which were previously used for voice communications only, are increasingly being used to transmit short message service ("SMS") messages, multimedia message service ("MMS") messages, symbols, graphics, photographs, video, audio, and/or multimedia to other cellular telephones and to other types of electronic devices.

However, within the wide range of electronic devices that may be configured to communicate with each other over some type of network, there may exist electronic devices with differing available features or communication options. For example, some types of cellular telephones are capable of transmitting and receiving MMS messages, video, and/or other content while others are not.

Hence, protocols have been developed for "session negotiation" between devices. Using such protocols, two devices, for example, can notify each other of their supported communication options and establish an option that both devices can support. However, these protocols are not adequate for the more sophisticated communication options that are becoming increasingly available.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary feature set based content communications systems and methods are described herein. The systems and methods described herein enable transmission of various types of content between access devices that may have differing available feature sets.

As used herein, "content" may refer to one or more "content instances," which may include, but are not limited to, electronic data representative of text, one or more messages (e.g., SMS messages or MMS messages), one or more symbols, one or more graphics, one or more images (e.g., digital photographs and video frames), video, audio, multimedia, navigational maps and/or directions, signaling for communication session, or any segment, portion, component, or combination thereof. The terms "feature set," "feature," and variations thereof will be used herein to refer to one or more available capabilities of an access device related to the transmission of content such as, but not limited to, SMS messaging capabilities, MMS messaging capabilities, video processing (e.g., transmission) capabilities, audio processing capabilities, navigation service capabilities, interactive menu display capabilities, storage capacity, processing power, bandwidth, subscription plan, and/or codec support capabilities.

In an exemplary system, a plurality of access devices is selectively and communicatively coupled to a profile management subsystem. The profile management subsystem is configured to maintain profile data for one or more of the access devices. As used herein, "profile data" corresponding to a particular access device represents an available feature set of that access device.

Hence, a first access device may detect the available feature set of a second access device by transmitting a profile request signal to the profile management subsystem. The profile request signal represents a request for profile data corresponding to the second access device.

The profile management subsystem may process the profile request and transmit the requested profile data to the first access device in response to the profile request signal. The first access device may receive and process the received profile data to determine an available feature set of the second access device. The first access device may then transmit content to the second access device in accordance with the detected feature set of the second access device. In this manner, access devices may base content transmissions between one another on feature sets supported by the access devices, without having to first establish direct feature negotiation sessions with one another.

Exemplary embodiments of feature set based content communications systems and methods will now be described in more detail with reference to the accompanying drawings.

Figure 1:
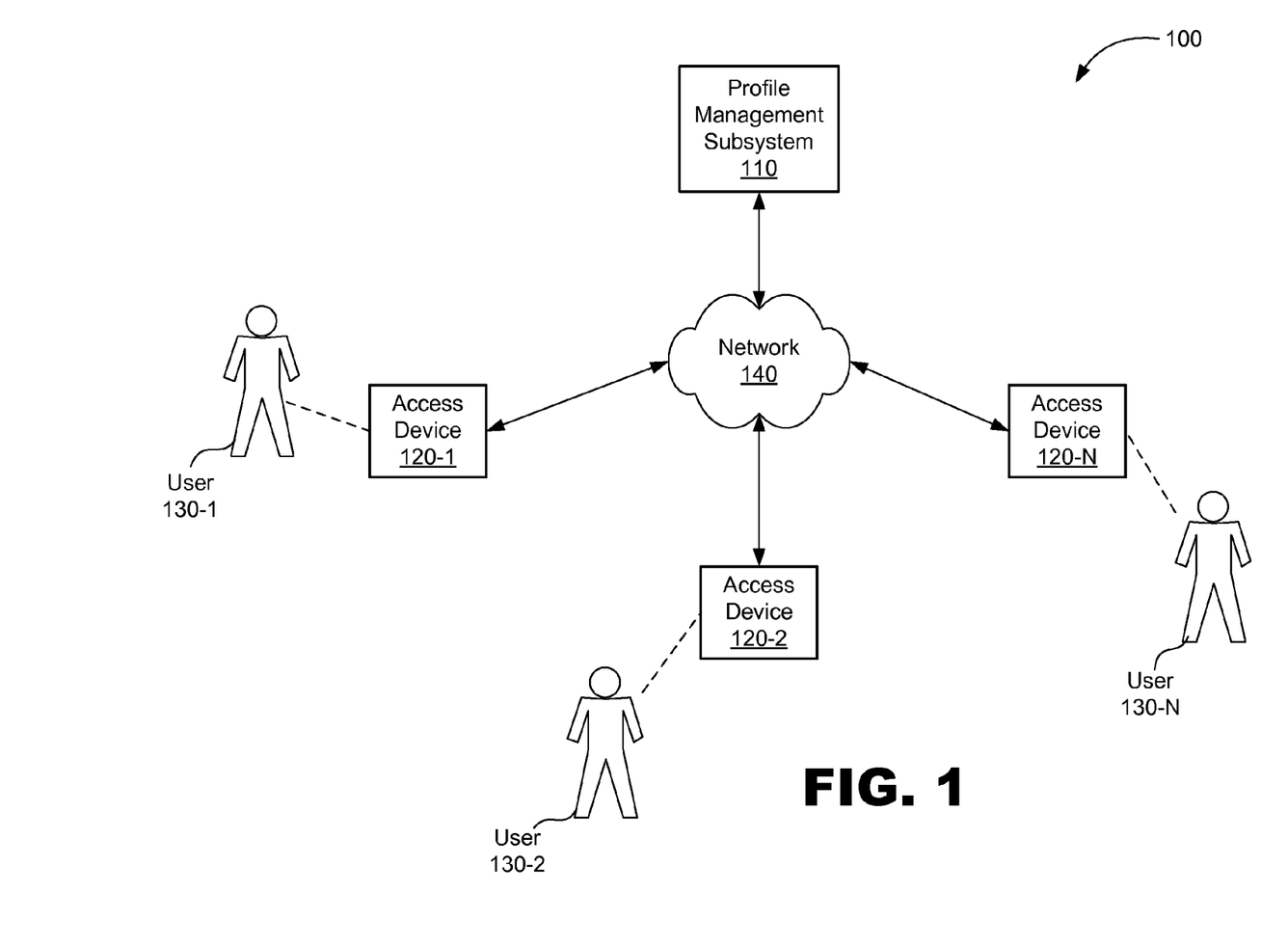
FIG. 1 illustrates an exemplary content communications system according to principles described herein.

FIG. 1 illustrates an exemplary feature set based content communications system 100. As shown in FIG. 1, feature set based content communications system 100 (or simply "system 100") may include a profile management subsystem 110 selectively and communicatively coupled to a plurality of access devices 120-1 through 120-N (collectively "access devices 120") by way of a network 140. Each of the access devices 120 may also be selectively and communicatively coupled one with another via the network 140. The profile management subsystem 110 and the access devices 120 will be described in more detail below.

The access devices 120 and the profile management subsystem 110 may communicate over network 140 using any communication platforms and technologies suitable for transporting data representative of content, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Short Message Service ("SMS"), Multimedia Message Service ("MMS"), socket connections, signaling system seven ("SS7"), Ethernet, in-band and out-of-band signaling technologies, Bluetooth, Wi-Fi, and other suitable communications networks and technologies.

Network 140 may include one or more networks, including, but not limited to, wireless networks (e.g., mobile telephone networks), broadband networks, voice communications networks (e.g., Voice over Internet Protocol "(VoIP)" networks and Public Switched Telephone networks ("PSTN")), closed media networks, subscriber television networks, cable networks, satellite networks, the Internet, intranets, local area networks, public networks, private networks, optical fiber networks, and/or any other networks capable of carrying data representative of content and communications signals between and among access devices 120 and profile management subsystem 110. Communications between and among the profile management subsystem 110 and the access devices 120 may be transported using any one of above-listed networks, or any combination of the above-listed networks.

In some examples, network 140 may include one or more closed networks such as closed provider-specific networks (e.g., a managed wireless telephone or VoIP network). A closed network may be configured to provide content and/or services to authenticated users (e.g., subscribers). Additionally or alternatively, network 140 may include an open network such as the Internet.

Access devices 120 may be associated with users, which in certain embodiments may be subscribers to or users of one or more services (e.g., a wireless telephone service) provided over network 140. As an example, FIG. 1 shows users 130-1, 130-2, and 130-N (collectively "users 130") as being associated with certain ones of the access devices 120. In FIG. 1, user 130-1 is associated with access device 120-1, user 130-2 is associated with access device 120-2, and user 130-N is associated with access device 120-N. It will be recognized that more than one user 130 may be associated with a particular access device 120 and that more than one access device 120 may be associated with a particular user 130. The exemplary users 130 and their associations with the access devices 120 shown in FIG. 1 are shown for illustrative purposes only. Other users 130 and user associations with access devices 120 may be defined in system 100.

In some examples, one or more components of the system 100 may include any computer hardware and/or instructions (e.g., software programs), or combinations of software and hardware, configured to perform the processes described herein. In particular, it should be understood that one or more components of system 100 may be implemented on one physical computing device or may be implemented on more than one physical computing device. Accordingly, system 100 may include any one of a number of computing devices, and may employ any of a number of computer operating systems, including, but by no means limited to, versions and/or varieties of the Microsoft Windows® operating system, the UNIX operating system, Macintosh® operating system, and the Linux® operating system.

Accordingly, one or more processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
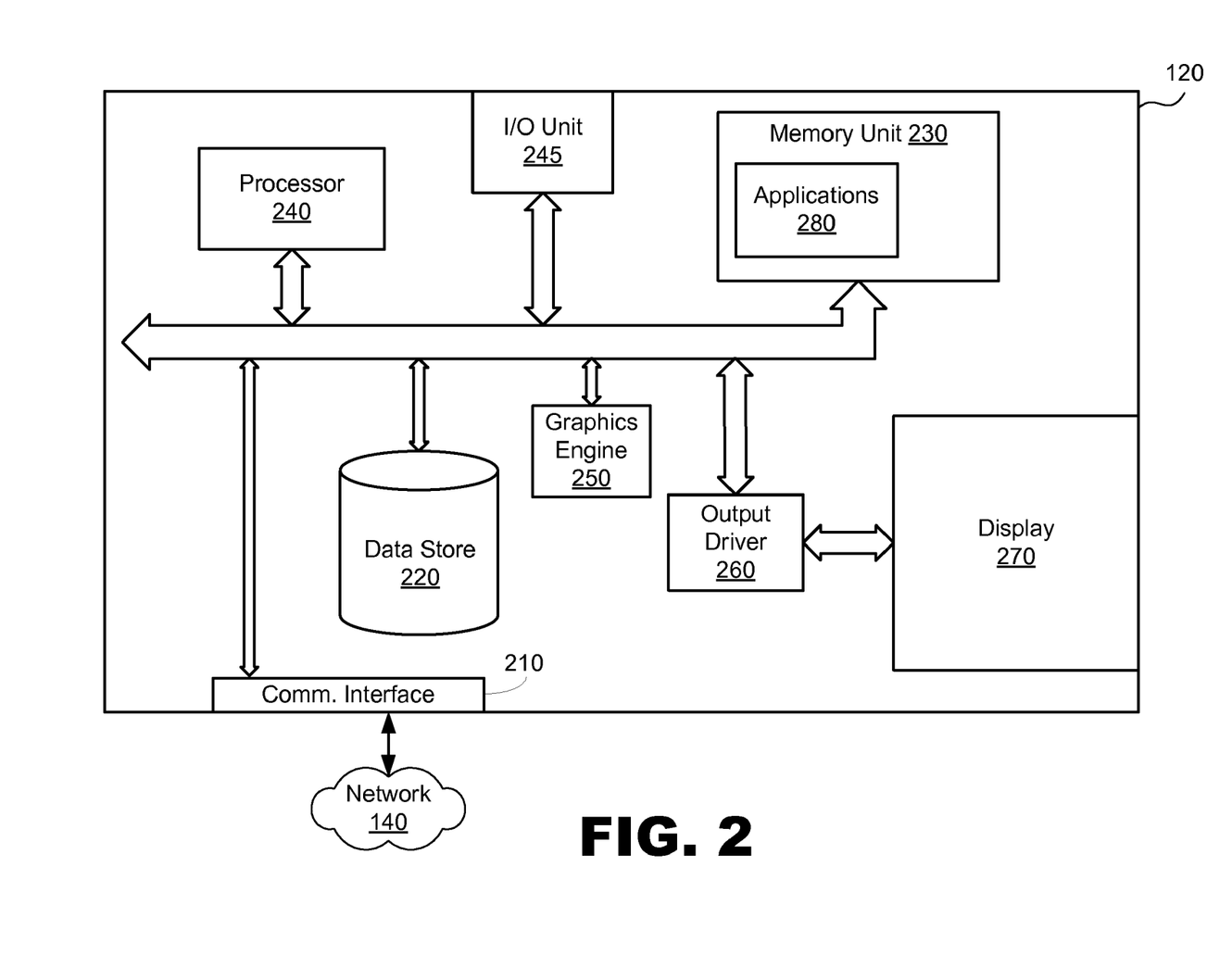
FIG. 2 illustrates an exemplary access device according to principles described herein.

FIG. 2 illustrates an exemplary access device 120. In general, access device 120 may include any device physically or remotely accessible to one or more users and that allows a user to send and receive communications and content to/from one or more other access devices 120 and/or the profile management subsystem 110 over network 140. Hence, access device 120 may include, but is not limited to, one or more wireless communication devices (e.g., cellular telephones and satellite pagers), wireless network devices, VoIP phones, video phones, broadband phones (e.g., Verizon® One phones and Verizon® Hub phones), video-enabled wireless phones, desktop computers, laptop computers, tablet computers, personal computers, personal data assistants, mainframe computers, mini-computers, vehicular computers, entertainment devices, gaming devices, music devices, video devices, closed media network access devices, set-top boxes, digital imaging devices, digital video recorders, personal video recorders, any network-connectible device having a display or content processing capability, and/or content recording devices (e.g., video cameras such as camcorders and still-shot digital cameras). Access device 120 may also be configured to interact with various peripherals such as a terminal, keyboard, mouse, display screen, printer, stylus, input device, output device, or any other apparatus.

As shown in FIG. 2, the access device 120 may include a communication interface 210, data store 220, memory unit 230, processor 240, input/output unit 245 ("I/O unit 245"), graphics engine 250, output driver 260, and display 270 communicatively connected to one another. While an exemplary access device 120 is shown in FIG. 2, the exemplary components illustrated in FIG. 2 are not intended to be limiting. Indeed, additional or alternative components and/or implementations may be included within the access device 120.

Communication interface 210 may be configured to send and receive communications over network 140, including sending and receiving data representative of content to/from another access device 120 and sending and receiving data to/from profile management subsystem 110. Communication interface 210 may include any device, logic, and/or other technologies suitable for transmitting and receiving data representative of content. The communication interface 210 may be configured to interface with any suitable communication media, protocols, formats, platforms, and networks, including any of those mentioned herein.

Data store 220 may include one or more data storage media, devices, or configurations and may employ any type, form, and combination of storage media. For example, the data store 220 may include, but is not limited to, a hard drive, network drive, flash drive, magnetic disc, optical disc, or other non-volatile storage unit. Data, including data representative of content, may be temporarily and/or permanently stored in the data store 220. Additionally or alternatively, as will be described in more detail below, profile data corresponding to the access device 120 and/or one or more other access devices 120 may be stored within data store 220.

Memory unit 230 may include, but is not limited to, FLASH memory, random access memory ("RAM"), dynamic RAM ("DRAM"), or a combination thereof. In some examples, as will be described in more detail below, applications executed by the access device 120 may reside in memory unit 230.

Processor 240 may be configured to control operations of components of the access device 120. Processor 240 may direct execution of operations in accordance with computer-executable instructions such as may be stored in memory unit 230. As an example, processor 240 may be configured to process content, including decoding and parsing received content and encoding content for transmission to another access device 120.

I/O unit 245 may be configured to receive user input and provide user output and may include any hardware, firmware, software, or combination thereof supportive of input and output capabilities. For example, I/O unit 245 may include one or more devices for recording content, including, but not limited to, a still-shot and/or video camera, scanner, microphone, keyboard or keypad, touch screen component, and receiver (e.g., an infrared receiver). Accordingly, a user of access device 120 can create content (e.g., by taking a picture or drafting a text message) and transmit the content to another access device 120.

As instructed by processor 240, graphics engine 250 may generate graphics, which may include graphical user interfaces ("GUIs"). The output driver 260 may provide output signals representative of the graphics generated by graphics engine 250 to display 270. The display 270 may then present the graphics for experiencing by the user.

One or more applications 280 may be executed by the access device 120. The applications, or application clients, may reside in memory unit 230 or in any other area of the access device 120 and be executed by the processor 240. Each application 280 may correspond to a particular feature or capability of the access device 120. For example, illustrative applications 280 may include one or more of a SMS messaging application, a MMS messaging application, a navigation application (e.g., a global positioning system ("GPS") application), a video application, an audio application, a multimedia application, a photograph application, a codec application, a particular communication application (e.g., a Bluetooth or Wi-Fi application), a communication signaling application, and/or any other content application representing any other access device feature or capability. In some examples, one or more of the applications 280 may be configured to direct the processor 240 to generate content. The content may then be transmitted to another access device 120 by the communication interface 210 as directed by the processor 240.

Figure 3:
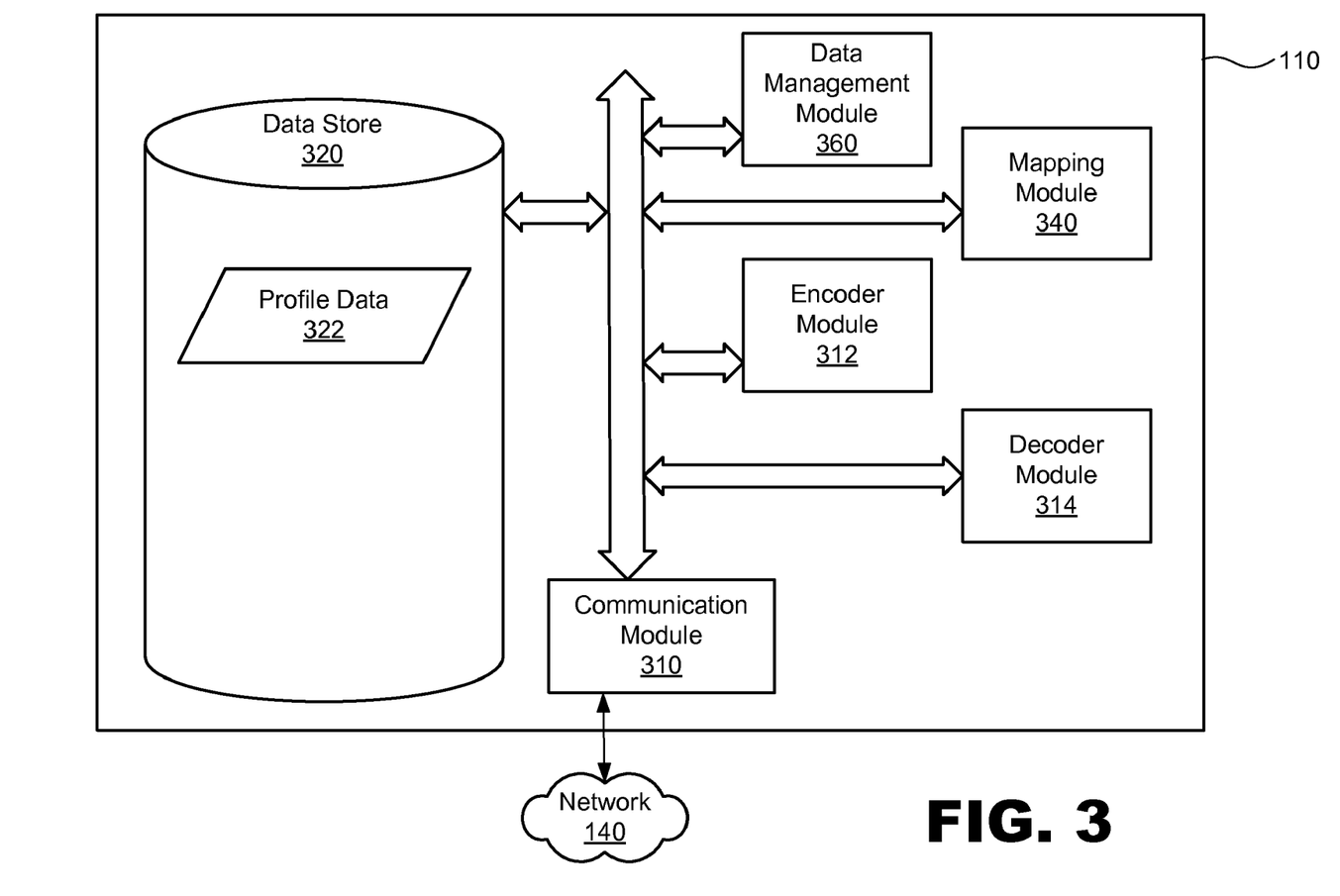
FIG. 3 illustrates an exemplary profile management subsystem according to principles described herein.

FIG. 3 illustrates an exemplary profile management subsystem 110. As will be described in more detail below, the profile management subsystem 110 is configured to manage, store, and/or otherwise process profile data corresponding to one or more of the access devices 120. As used herein, the term "profile data" (or simply "profile") will be used to refer to data describing or representing a set of available features (i.e., feature set) that corresponds to a particular access device 120. Hence, a profile corresponding to access device 120-1, for example, will differ from a profile corresponding to access device 120-2 if the two access devices 120-1 and 120-2 have different sets of available features.

While an exemplary profile management subsystem 110 is shown in FIG. 3, the exemplary components illustrated in FIG. 3 are not intended to be limiting. Indeed, additional or alternative components and/or implementations may be used.

As shown in FIG. 3, profile management subsystem 110 may include a communication module 310, which may be configured to transmit and receive communications over network 140, including receiving data representative of profiles and profile requests from and transmitting data representative of profiles to access devices 120 by way of network 140. The communication module 310 may include and/or support any suitable communication platforms and technologies for communicating with access devices 120 over network 140. In some examples, communication module 310 may include one or more servers configured to send and receive communications over network 140.

Profile management subsystem 110 may also include an encoder module 312 and decoder module 314, respectively configured to encode data to be transmitted and decode data that has been received. For example, encoder module 312 may be configured to encode data representative of a profile for transmission to an access device 120 over network 140, and decoder module 314 may be configured to decode signals and data received from an access device 120 over network 140.

Encoder 312 and decoder 314 modules may be configured to support a variety of communication platforms, protocols, and formats such that profile management subsystem 110 can receive data from and distribute data to access devices 120 using a variety of platforms (e.g., a mobile telephone service platform, a web-based platform, a subscriber television platform, etc.) and using a variety of communications technologies. Accordingly, the profile management subsystem 110 may support a multi-platform system in which data may be shared across diverse platforms.

Profile management subsystem 110 may also include a data store 320 configured to store electronic data. Data store 320 may include one or more data storage mediums, devices, or configurations and may employ any type, form, and combination of well known storage media, including hard disk drives, read-only memory, caches, databases, optical media, and random access memory. Data store 320 may include any known technologies useful for storing, updating, searching, modifying, accessing, retrieving, and deleting electronic data. While FIG. 3 illustrates a single data store 320, the data store 320 may include multiple data storage media, databases, or devices.

Data store 320 may store any suitable type or form of electronic data. As shown in FIG. 3, data store 320 may be configured to store profile data 322. As described herein, profile data 322 may include data representative of one or more sets of available features that correspond to a one or more access devices 120. Profile data 322 may be organized, indexed, or searched in any suitable manner. For example, the profile data 322 may be indexed within data store 320 according to telephone number, a unique identification number corresponding to each access device 120, or some other attribute of each access device 120.

As shown in FIG. 3, the profile management subsystem 110 may include a mapping module 340 configured to map a profile request received from one of the access devices 120 to one of the profiles stored within the data store 320.

The profile management subsystem 110 may also include a data management module 360, which may include any devices and/or technologies configured to manage the data stored in data store 320, including accessing, updating, searching, modifying, deleting, and adding to the data. The data management module 360 may communicate with other components of the profile management subsystem 110 to receive and store or access and provide profile data 322. For example, the data management module 360 may be configured to update one or more profiles stored within the data store 320 upon receiving a request from a user.

As mentioned, it is often desirable for a particular access device 120 to transmit content to another access device 120. For example, user 130-1 of access device 120-1 may desire to transmit content to user 130-2 of access device 120-2. However, a particular access device 120 may have an available feature set that differs from the available feature set of another access device 120. For example, access device 120-1 may include video, audio, and navigation service capabilities while access device 120-2 may not include one or more of these capabilities. Additionally or alternatively, a particular access device 120 may be limited in storage or memory capacity, network capabilities, processing power, graphical capabilities, bandwidth, subscription plan, or in some other way.

Hence, it is often desirable for a user 130 to know which features are available on a particular access device 120 to which he or she desires to transmit content. To this end, a session negotiation channel may be established between two or more access devices 120 through which the respective features available on each access devices 120 may be detected. In this manner, a particular access device 120 may transmit only that content which may be processed or otherwise handled by an intended recipient access device 120.

Figure 4:
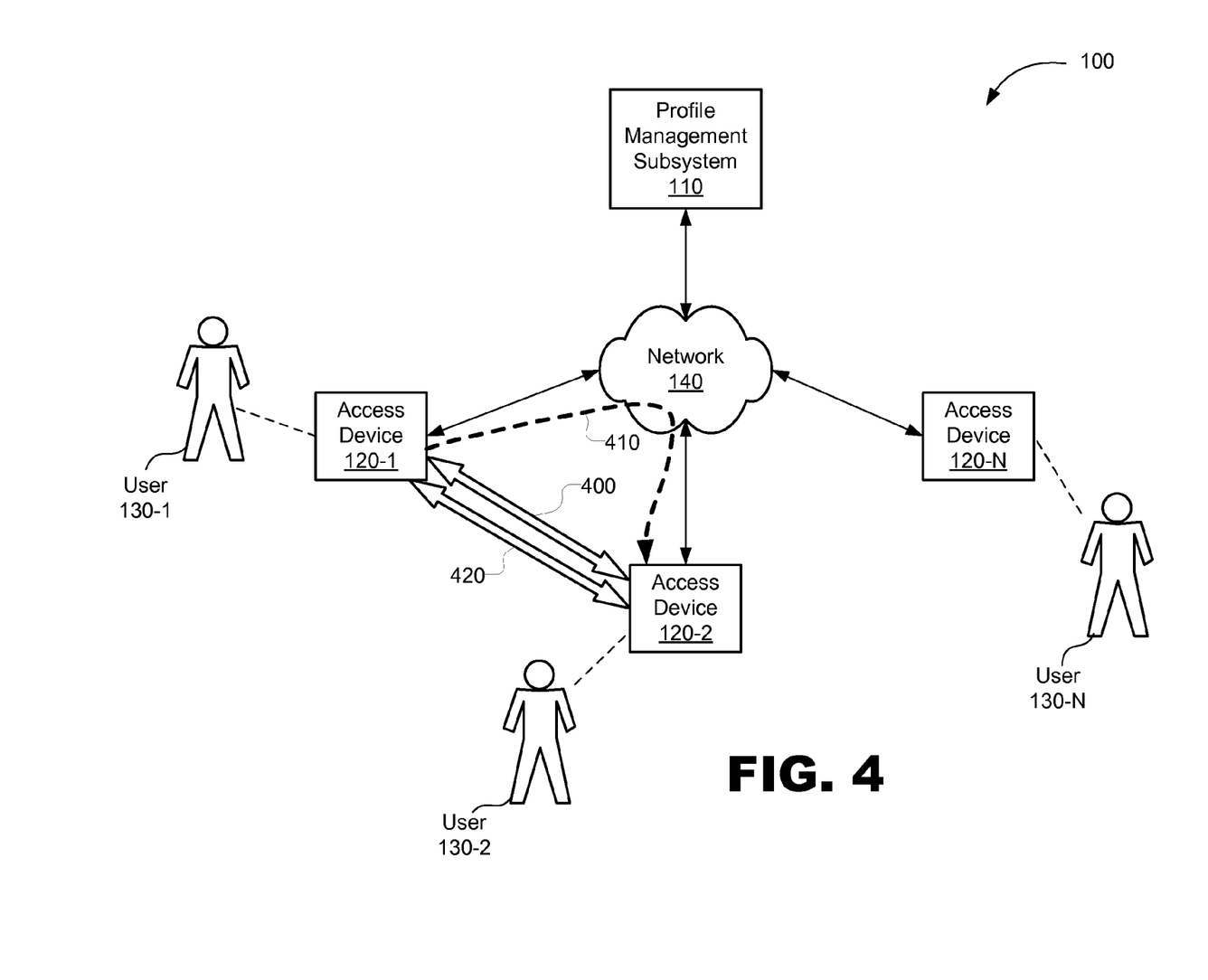
FIG. 4 illustrates an exemplary configuration of the content communications system wherein a session negotiation channel is established between two access devices according to principles described herein.

To illustrate, FIG. 4 shows a configuration wherein user 130-1 of access device 120-1 desires to transmit content to user 130-2 of access device 120-2. To this end, a session negotiation channel 400 may be established between the two access devices 120-1 and 120-2. To establish the session negotiation channel 400, a request signal 410 is first transmitted from access device 120-1 to access device 120-2 via network 140, as shown in FIG. 4. The request signal 410 may be configured and sent in accordance with a pre-determined protocol such as, but not limited to, a Session Description Protocol ("SD P").

Once the request signal 410 has been received and processed by access device 120-2, session negotiation information may be exchanged between the two access devices 120-1 and 120-2 to detect or determine the available feature set of each of the access devices 120-1 and 120-2.

After the available feature sets of each of the access devices 120-1 and 120-2 are determined, a communications channel 420 may be established therebetween, as shown in FIG. 4. Content may then be transmitted via the communications channel 420 between the access devices 120-1 and 120-2 in accordance with the available feature sets of each of the access devices 120-1 and 120-2.

However, session negotiation is often not adequate for relatively sophisticated features available via many types of access devices 120. For example, network capabilities, some types of messaging service capabilities, and other features are difficult to determine in an efficient manner via traditional session negotiation protocols.

Moreover, the request signal 410 that has to be sent and the session negotiation channel 400 that has to be established each time content is to be transmitted between access devices 120 requires bandwidth that could otherwise be used to more efficiently transmit content throughout the network 140. For example, if content is transmitted on a regular basis between two access devices 120 (e.g., between access devices 120 corresponding to members of a family or group of friends), session negotiation merely serves to detect feature sets that have been detected many times before.

Session negotiation between access devices 120 also requires that the access devices 120 be configured to process request signals 410 and establish session negotiation channels 400 with many different types of access devices 120. Such capability is becoming increasingly difficult to ensure because of the number of different access devices 120 on the market today.

Hence, in some examples, the available features corresponding to a particular access device 120 may be obtained from the profile management subsystem 110 instead of directly from the access device 120. To illustrate, FIG. 5 shows an exemplary configuration wherein access device 120-1 communicates with the profile management subsystem 110 to determine the available feature set of another access device 120-2.

Figure 5:
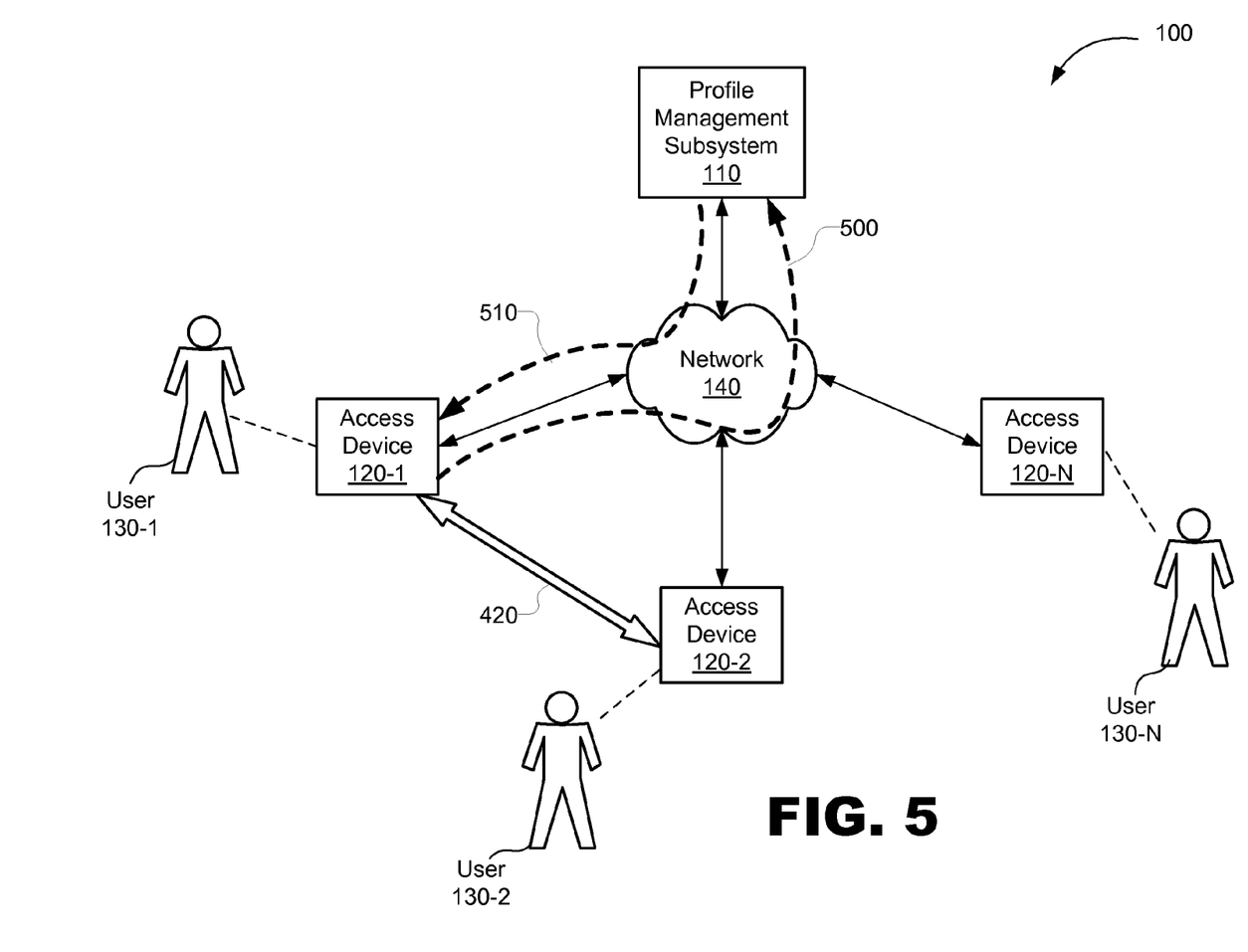
FIG. 5 illustrates an exemplary configuration of the content communications system wherein a communications channel is established between access devices that are associated with the same network according to principles described herein.

In the configuration shown in FIG. 5, user 130-1 of access device 120-1 desires to transmit content to user 130-2 of access device 120-2. To this end, access device 120-1 may transmit a profile request signal 500 to the profile management subsystem 110 via network 140. The profile request signal 500 may include instructions for the profile management subsystem 110 to search for and transmit profile data corresponding to access device 120-2 to access device 120-1. In some examples, the profile request signal 500 may include a unique identification code or number corresponding to the target access device 120-2. For example, the profile request signal 500 may include a telephone number, unique hardware identification code, or other suitable identification number corresponding to access device 120-2. The profile management subsystem 110 may use the unique identification code to map the profile request signal 500 to the appropriate profile data stored within its data store 320.

As mentioned, the profile management subsystem 110 may maintain profile data corresponding to one or more access devices 120 that are associated with network 140. Various methods of obtaining and updating profile data within the profile management subsystem 110 will be described in more detail below.

Once the profile request signal 500 has been received, the profile management subsystem 110 may process the profile request signal 500 and transmit the requested profile data back to access device 120-1, as represented in FIG. 5 by signal 510. Signals 500 and 510 may be transmitted between access device 120-1 and profile management subsystem 110 in accordance with any suitable protocol or platform.

Access device 120-1 may receive and process the profile data corresponding to access device 120-2 and thereby determine the available feature set of access device 120-2. A communications channel 420 may then be established between the two access devices 120-1 and 120-2 through which content may be transmitted in accordance with the available feature set of access device 120-2.

One exemplary implementation of the systems and methods described herein includes an interactive voice response system wherein the first access device 120-1 is configured to provide various options that may be selected by means of voice commands provided by users who call into the interactive voice response system. In some examples, one or more of the users who call into the interactive voice response system may be using an access device (e.g., access device 120-2) that has the capability of displaying interactive graphical menus that match the voice prompts provided by the first access device 120-1. Hence, by using the systems and methods described herein, the first access device 120-1 may be able to determine whether the access device 120-2 is capable of displaying such menus and accordingly transmit content representing the menus to the access device 120-2.

To further illustrate the systems and methods described herein, it may be desirable for a user of access device 120-1 to transmit a navigation request to a user of access device 120-2. The navigation request may include a request for the access device 120-2 to transmit GPS coordinates and/or navigational directions to the access device 120-1. However, some access devices 120 are not capable of providing such navigational data. Hence, the systems and methods described herein may be used by access device 120-1 to determine whether access device 120-2 is capable of complying with a navigation request.

It will be recognized that the above-mentioned examples are merely illustrative of the many different implementations of the systems and methods described herein and that the systems and methods described herein may be used to facilitate communication of any type of content between various access devices 120 based on discovered feature set profile data as may serve a particular application.

In some examples, access device 120-1 may be configured to store the profile data corresponding to access device 120-2 in data store 220 or in some other device once the profile data has been transmitted thereto by the profile management subsystem 110. For example, profile data for access device 120-2 may be stored within a "contact list" located at access device 120-1. In this manner, access device 120-1 may use locally stored profile data for future communications with access device 120-2.

In some examples, profile data stored within an access device 120 may be periodically updated with profile data stored within profile management subsystem 110. For example, an access device 120 may be configured to periodically poll the profile management subsystem 110 for updates to any profile data stored in data store 220, or profile management subsystem 110 may be configured to proactively notify access device 120 of updated profile data and/or push updated information to the access device 120. Hence, profile data stored within the access device 120 may be kept current.

Additionally or alternatively, a user 130 of a particular access device 120 may manually input profile data corresponding to one or more other access devices 120 into a contact list or other database located within the user's access device 120. For example, in the example of FIG. 5, user 130-1 may manually input profile data corresponding to access device 120-2 into a contact list located within access device 120-1.

With profile data for access device 120-2 stored locally on access device 120-1, content may be transmitted by access device 120-1 to access device 120-2 without having to request profile data from profile management subsystem 110. The use of locally stored profile data can reduce the number of requests sent to the profile management subsystem 110, thereby conserving network bandwidth.

Figure 6:
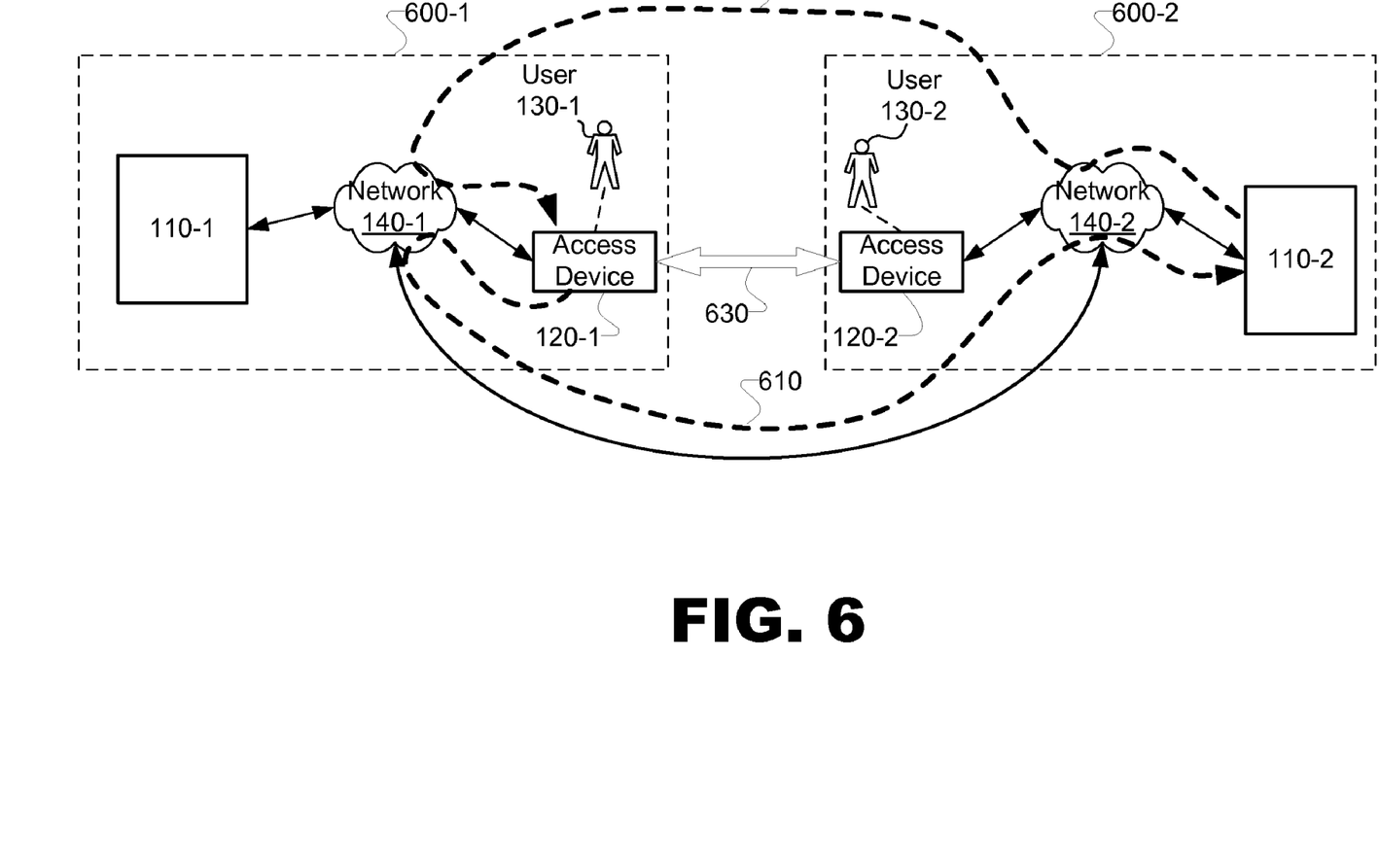
FIG. 6 illustrates an exemplary configuration of the content communications system wherein a communications channel is established between access devices that are associated with different networks according to principles described herein.

The access devices 120 and the profile management subsystem 110 shown in FIG. 5 may be associated with the same network 140 (e.g., a provider-specific network). However, in some examples, it may be desirable to transmit content between access devices 120 that are associated with different networks 140. For example, FIG. 6 illustrates a configuration wherein the first access device 120-1 is associated with a first network 140-1 and the second access device 120-2 is associated with a second network 140-2. Each network 140 may also include its own profile management subsystem 110. For example, profile management subsystem 110-1 shown in FIG. 6 is associated with the first network 140-1 and profile management subsystem 110-2 is associated with the second network 140-2.

As shown in FIG. 6, the first and second networks 140-1 and 140-2 may each be configured to be associated with separate provider-specific groups or network domains 600-1 and 600-2, respectively. Each provider-specific group 600 (e.g., group 600-1) may include a network 140 (e.g., network 140-1), a profile management subsystem 110 (e.g., profile management subsystem 110-1), and at least one access device (e.g., access device 120-1). An exemplary, but not limiting, provider-specific group 600 may include a provider-specific network of wireless telephones.

A number of different methods may be used to facilitate feature set based transmission of content from an access device 120 within one provider-specific group (e.g., 600-1) to an access device 120 within another provider-specific group (e.g., 600-2). For example, to transmit content from the first access device 120-1 to the second access device 120-2 shown in FIG. 6, a profile request signal 610 may be transmitted from the first access device 120-1 to the second profile management subsystem 110-2 via networks 140-1 and 140-2.

Once the profile request signal 610 has been received by the profile management subsystem 110-2, the profile management subsystem 110-2 may process the profile request signal 610 and transmit the requested profile data to access device 120-1, as represented in FIG. 6 by signal 620. Signals 610 and 620 may be transmitted between access device 120-1 and profile management subsystem 110-2 in accordance with any suitable protocol or platform configured to facilitate communication between different networks 140-1 and 140-2.

Access device 120-1 may receive and process the profile data corresponding to access device 120-2 and thereby determine the available feature set of access device 120-2. A communications channel 630 may then be established between the two access devices 120-1 and 120-2 through which content may be transmitted in accordance with the available feature set of access device 120-2.

In some examples, access device 120-2 may request profile data corresponding to access device 120-1 from profile management subsystem 110-1 in a similar manner to that described above in connection with access device 120-1. Alternatively, the request signal 610 transmitted by the first access device 120-1 to profile management subsystem 110-2 may include profile data corresponding to the first access device 120-1. The transmitted profile data may then be communicated from profile management subsystem 110-2 to access device 120-2 so that access device 120-2 can transmit content to access device 120-1 without having to request the profile data corresponding to access device 120-1 from profile management subsystem 110-1.

Figure 7:
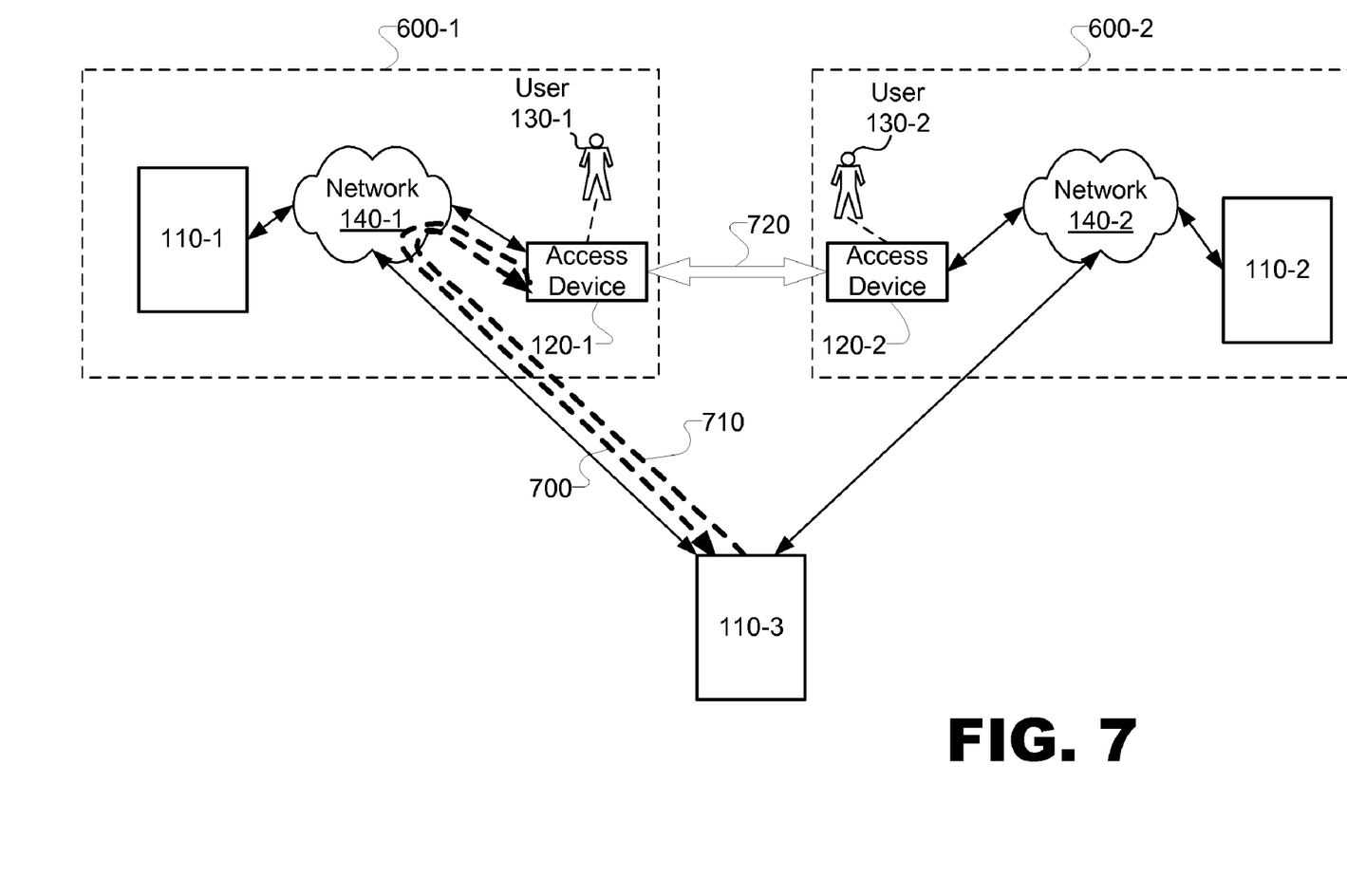
FIG. 7 illustrates an exemplary configuration of the content communications system wherein an independent profile management subsystem is configured to facilitate detection of available feature sets between access devices that are associated with different networks according to principles described herein.

FIG. 7 illustrates an exemplary alternative configuration wherein an independent profile management subsystem 110-3 is configured to facilitate detection of available feature sets between access devices 120 that are associated with different networks (e.g., network 140-1 and network 140-2). As shown in FIG. 7, the independent profile management subsystem 110-3 may be communicatively coupled to both networks 140-1 and 140-2. In this manner, profile data corresponding to one or more of the access devices 120 associated with different networks 140-1 and 140-2 may be uploaded to the independent profile management subsystem 110-3, where the data may be maintained and accessed as desired.

To illustrate, to transmit content from the first access device 120-1 to the second access device 120-2 shown in FIG. 7, a profile request signal 700 may be transmitted from the first access device 120-1 to the independent profile management subsystem 110-3 via networks 140-1.

The independent profile management subsystem 110-3 may process the profile request signal 700 and transmit the requested profile data to access device 120-1, as represented in FIG. 7 by signal 710. Signals 700 and 710 may be transmitted between access device 120-1 and independent profile management subsystem 110-3 in accordance with any suitable protocol or platform.

Access device 120-1 may then process the profile data corresponding to access device 120-2 and thereby determine the available feature set of access device 120-2. A communications channel 720 may then be established between the two access devices 120-1 and 120-2 through which content may be transmitted in accordance with the available feature set of access device 120-2.

In some examples, after a particular access device 120 has determined the available feature set of another access device 120, information representative of the feature set may be presented for consideration by a user of the access device 120. In some examples, one or more graphics representing the available feature set may be displayed on the display 270 of the particular access device 120.

Figure 8:
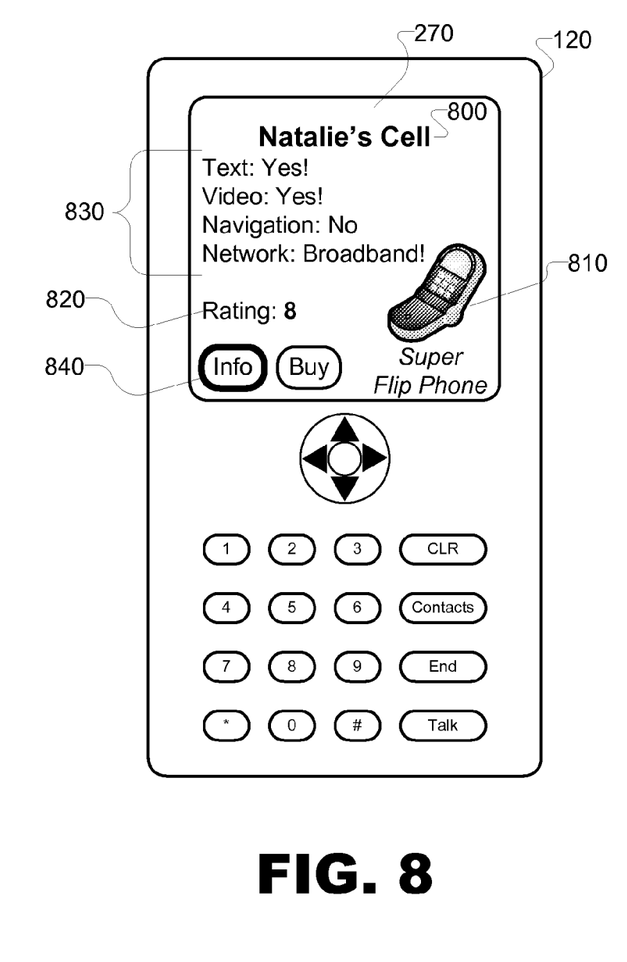
FIG. 8 illustrates an exemplary access device having a display configured to display graphics representing an available feature set of another access device according to principles described herein.

For example, FIG. 8 illustrates an exemplary access device 120 having a display 270 configured to display graphics representing the available feature set of another access device 120 (referred to in this example as the "receiving" access device for illustrative purposes). As shown in FIG. 8, a name 800, image 810, and rating 820 of the receiving access device may be displayed along with a listing 830 of the features of the receiving access device. The user 130 of access device 120 may then easily see what type of access device another user 130 is using, as well as the available features of that access device.

Various additional options 840 related to the receiving access device may also be displayed by the access device 120. For example, the user may select an option to obtain additional information about the receiving access device and/or select an option to purchase an access device similar to the receiving access device. It will be recognized that additional or alternative graphics to those illustrated in FIG. 8 may be displayed by access device 120 as may serve a particular application.

Figure 9:
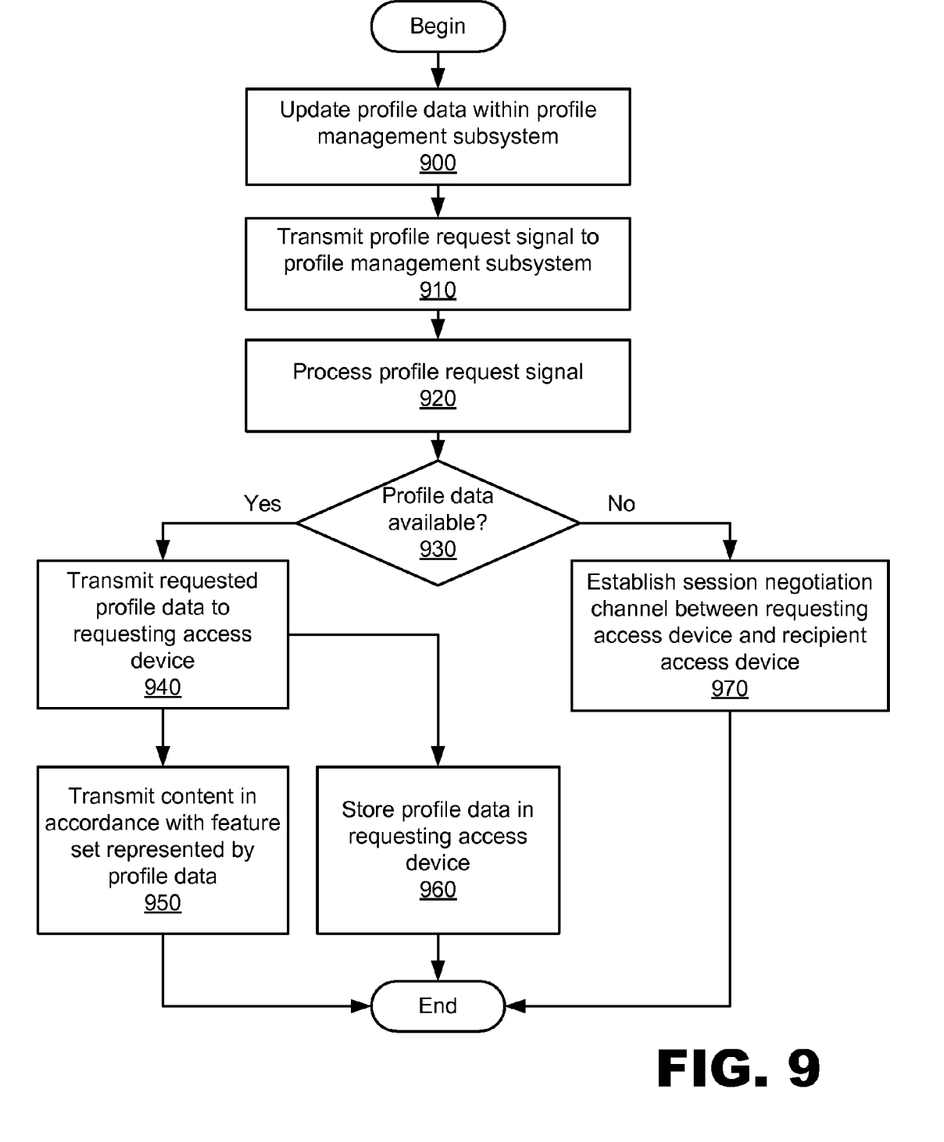
FIG. 9 illustrates an exemplary method of facilitating transmission of content between first and second access devices according to principles described herein.

FIG. 9 illustrates an exemplary method of facilitating feature set based transmission of content between first and second access devices 120. While FIG. 9 illustrates exemplary steps according to one embodiment, other embodiments may omit, add to, reorder, and/or modify any of the steps shown in FIG. 9.

While the method of FIG. 9 will be described in the context of transmission of content between two access devices 120 that may or may not be associated with the same network 140, it will be recognized that the method may be extended to facilitate transmission of content between any number of access devices.

In step 900, profile data is updated within the profile management subsystem 110. The profile management subsystem 110 may be configured to be associated with the same network 140 as one or more of the access devices 120. Alternatively, the profile management subsystem 110 may be configured as an independent profile management subsystem 110 as described herein.

In some examples, profile data corresponding to one or more of the access devices 120 is automatically obtained and updated by the profile management subsystem 110 when the access devices 120 are connected to or communicate via network 140. For example, if network 140 includes a provider-specific network, each access device 120 that is a part of the provider-specific network may include a subscriber identity module ("SIM") card or other unique identifier. When these access devices 120 communicate via the provider-specific network, their profile data may be automatically uploaded, updated, and/or otherwise verified within the profile management subsystem 110.

In some alternative examples, profile data corresponding to one or more of the access devices 120 may be manually updated within the profile management subsystem 110 by one or more users. For example, a web portal or the like may be provided wherein a user may input profile data corresponding to one or more access devices 120. The input profile data may then be used to update the profile data stored within the profile management subsystem 110.

To facilitate transmission of content from the first access device (e.g., access device 120-1) to the second access device (e.g., access device 120-2), a profile request signal is transmitted by the first access device 120-1 (also referred to as the "requesting access device" in this example) to the profile management subsystem 110, as shown in step 910. The profile request signal may include instructions for the profile management subsystem 110 to search for and transmit profile data corresponding to access device 120-2 to access device 120-1.

The profile management subsystem 110 may process the profile request signal, as shown in step 920. In step 930, if profile data corresponding to the second access device 120-2 is determined to be available within the profile management subsystem 110 (Yes; step 930), the requested profile data is transmitted from the profile management subsystem 110 to the first access device 120-1, as shown in step 940. In step 950, content may then be transmitted from the first access device 120-1 to the second access device 120-2 in accordance with the feature set of the second access device 120-2 as represented by the profile data.

In some examples, the requested profile data may be stored by the requesting access device 120-1, as shown in step 960. The access device 120-1 may then subsequently transmit content to the second device 120-2 without having to re-request profile data from the profile management subsystem 110.

Returning to step 930, if profile data corresponding to the second access device 120-2 is not available within the profile management subsystem 110 (No; step 930), a session negotiation channel may be established between the two access devices 120-1 and 120-2 (step 970). The session negotiation channel may then be used to detect the feature set of the second access device 120-2 as described hereinabove.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   an access device associated with an interactive voice response system; and
   a profile management subsystem selectively and communicatively coupled to said access device, said profile management subsystem being configured to
      receive a profile request signal from said access device, said profile request signal comprising a unique identifier specifically identifying a telephone that has called in to the interactive voice response system and representing a request for profile data corresponding to said telephone specifically identified by the unique identifier, and
      access and transmit said requested profile data corresponding to the telephone to said access device in response to receiving said profile request signal;
   wherein said access device is configured to
      determine, based on the requested profile data, that the telephone is capable of displaying one or more interactive graphical menus that match one or more voice prompts provided by the interactive voice response system, and
      transmit, by way of a communications channel established between the access device and the telephone, content representative of the one or more interactive graphical menus to said telephone.

2. The system of claim 1, wherein said access device comprises a data store, and wherein said access device is further configured to store said profile data corresponding to said telephone within said data store in response to receiving the profile data from the profile management subsystem.

3. The system of claim 2, wherein said access device is configured to use said stored profile data to communicate with said telephone subsequent to transmitting the content representative of the one or more interactive graphical menus to the telephone.

4. The system of claim 1, wherein said profile management subsystem and said access device are a part of a provider-specific network.

5. The system of claim 4, wherein said telephone is a part of said provider-specific network.

6. The system of claim 1, wherein said access device is a part of a provider-specific network, and wherein said profile management subsystem is not included within said provider-specific network.

7. The system of claim 1, wherein said profile data is representative of a feature set corresponding to the telephone, wherein the feature set comprises at least one capability related to one or more of short message service messaging, multimedia message service messaging, video transmission, audio transmission, navigation services, interactive menu display, storage capacity, processing power, bandwidth, subscription plan, and codec support.

8. The system of claim 1, wherein said access device is further configured to transmit additional content to the telephone in accordance with the profile data corresponding to the telephone, the additional content comprises at least one of a short message service message, a multimedia message service message, a symbol, a graphic, a photograph, video content, audio content, navigational data, and multimedia content.

9. The system of claim 1, wherein said access device comprises a display configured to display information related to a feature set of said telephone as defined in the profile data corresponding to the telephone.

10. The system of claim 1, wherein said profile management subsystem is configured to receive the profile data from the telephone prior to accessing the profile data.

11. An apparatus comprising:
    a communication interface configured to
       transmit a profile request signal to a profile management subsystem over a network, the profile request signal comprising a unique identifier specifically identifying a telephone that has called in to an interactive voice response system and representative of a request for profile data corresponding to the telephone specifically identified by the unique identifier, and
       receive the profile data from the profile management subsystem in accordance with the profile request signal;
    a processor communicatively coupled to said communication interface and configured to
       determine, based on the profile data, that the telephone is capable of displaying one or more interactive graphical menus that match one or more voice prompts provided by the interactive voice response system, and
       direct said communication interface to transmit, by way of a communications channel established between the apparatus and the telephone, content representative of the one or more interactive graphical menus to said telephone.

12. The apparatus of claim 11, further comprising a data store communicatively coupled to said processor and configured to store said profile data corresponding to said telephone in response to receiving the profile data from the profile management subsystem.

13. The apparatus of claim 12, wherein said processor is configured to use said stored profile data to direct said communication interface to transmit additional content to said telephone subsequent to transmitting the content representative of the one or more interactive graphical menus to the telephone.

14. The apparatus of claim 11, wherein said profile data is representative of a feature set corresponding to the telephone, wherein the feature set comprises at least one capability related to one or more of short message service messaging, multimedia message service messaging, video transmission, audio transmission, navigation services, interactive menu display, storage capacity, processing power, bandwidth, subscription plan, and codec support.

15. The apparatus of claim 11, wherein said processor is further configured to direct the communication interface to transmit additional content to the telephone in accordance with the profile data corresponding to the telephone, the additional content comprises at least one of a short message service message, a multimedia message service message, a symbol, a graphic, a photograph, video content, audio content, navigational data, and multimedia content.

16. The apparatus of claim 11, further comprising a display communicatively coupled to said processor and configured to display information related to a feature set of said telephone as defined in the profile data corresponding to the telephone.

17. A method comprising:
   transmitting, by an access device associated with an interactive voice response system, a profile request signal to a profile management subsystem over a network, the profile request signal comprising a unique identifier specifically identifying a telephone that has called in to the interactive voice response system and representative of a request for profile data corresponding to the telephone specifically identified by the unique identifier;
   receiving, by the access device, the profile data from the profile management subsystem in accordance with the profile request signal;
   determining, by the access device based on the profile data, that the telephone is capable of displaying one or more interactive graphical menus that match one or more voice prompts provided by the interactive voice response system; and
   transmitting, by the access device by way of a communications channel established between the apparatus and the telephone, content representative of the one or more interactive graphical menus to the telephone.

18. The method of claim 17, wherein the unique identifier comprises a telephone number associated with the telephone.

19. The method of claim 17, further comprising displaying, by the access device, information related to a feature set of said telephone as defined in the profile data corresponding to the telephone.

20. The method of claim 17, further comprising storing, by the access device, said profile data corresponding to said telephone in response to receiving the profile data from the profile management subsystem.

* * * * *